May 13, 1958 B. H. CISCEL 2,834,929
AUTOMATIC STEERING APPARATUS
Filed Feb. 6, 1953
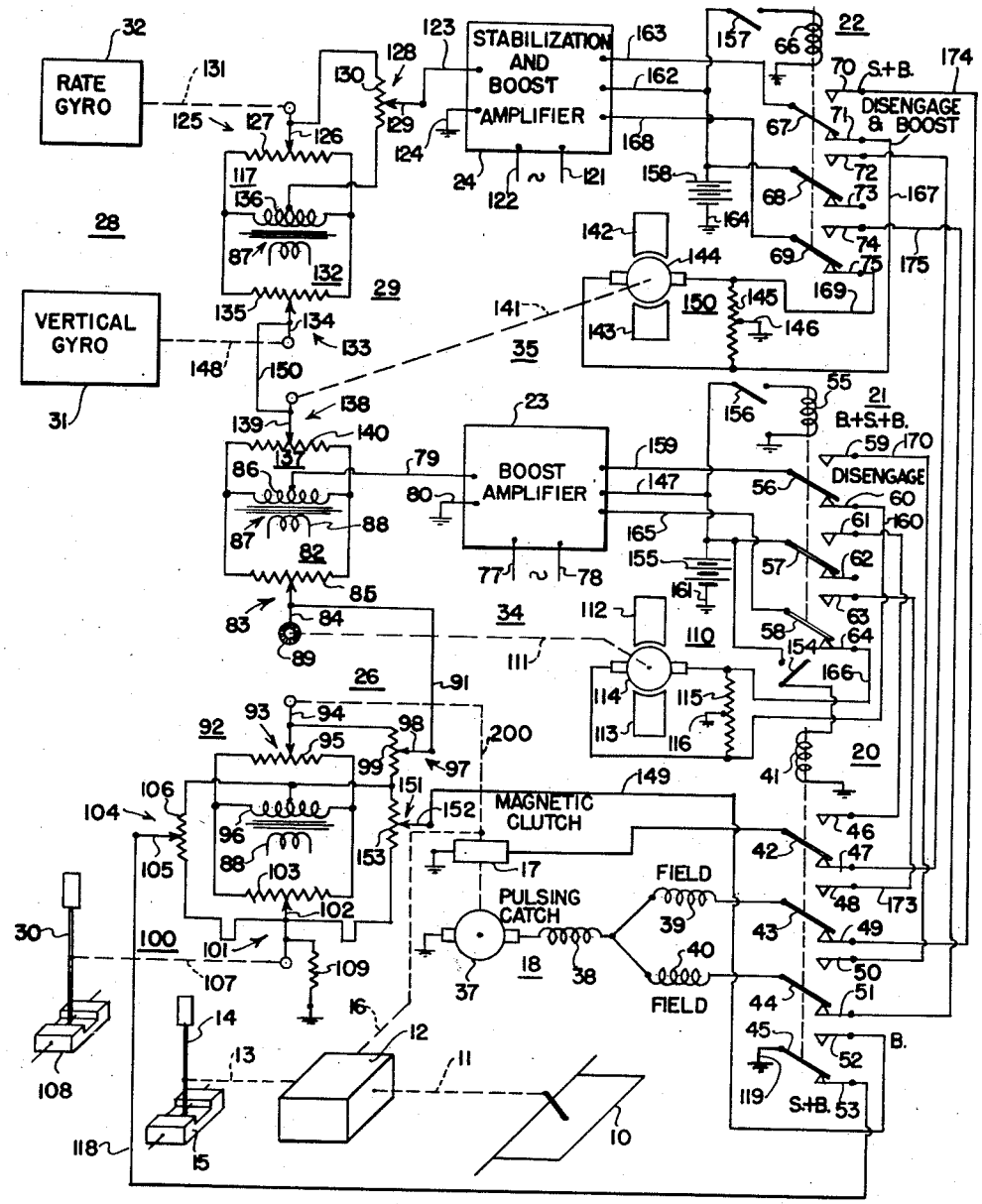
INVENTOR.
BENJAMIN H. CISCEL
BY
*George H. Fisher*
ATTORNEY United States Patent Office 2,834,929
Patented May 13, 1958

2,834,929

AUTOMATIC STEERING APPARATUS

Benjamin H. Ciscel, Golden Valley, Minn., assignor to Minneapolis-Honeywell Regulator Company, Minneapolis, Minn., a corporation of Delaware Application February 6, 1953, Serial No. 335,563

12 Claims. (Cl. 318—489)

This invention pertains to automatic steering apparatus or automatic pilots for dirigible craft such as aircraft. Such type of dirigible craft have control surfaces that may be automatically operated to control the attitude of the craft about its axes to provide stabilized flight. Such control surfaces may also be directly manually operated to change craft attitude at which time the automatic stabilizing means is disconnected from the control surfaces. During such manual operation, the automatic stabilizing means is synchronized with the change in craft attitude, so that stabilized control may be reapplied for the new attitude manually selected.

In some instances, provision has been made for manually controlling the control surfaces through the automatic stabilizing means. While in one configuration, manual changes through the stabilizing means are made against opposition of attitude sensing devices in the stabilizing means, yet in another configuration it is possible to make manual changes in attitude through the automatic means but excluding the attitude sensing devices so that the devices offer no opposition to such manual changes in craft attitude.

When changing the configuration of manual control through the automatic stabilizing means from manual only to manual control plus attitude sensing devices such changes should be made without causing changes in craft attitude due solely to change from one to the other configuration.

It is an object of the present invention to provide a control appartus for a dirigible craft for permitting the control of the craft attitude to be shifted from reliance solely upon manual operation initiation controlling devices to reliance jointly upon the manual devices and attitude sensing devices without the production of abrupt deflections of the craft control surfaces.

It is an object of this invention to provide in an automatic stabilizing apparatus for a dirgible craft having attitude sensing devices and manually operable control devices for controlling attitude, synchronizing means for conditioning said stabilizing apparatus so that no change in attitude of the craft results when changing from a configuration comprising solely manually operable control devices for initiating changes in craft attitude to one comprising the manually operable devices and craft attitude responsive devices.

It is a further object of this invention to provide an automatic stabilizing apparatus for a dirigible craft with means for providing smooth transition from attitude control by manually operable control devices to attitude control including said manually operable devices and additionally attitude responsive devices.

It is a further object of this invention to control a servomotor alternatively from two amplifiers each having a balanceable control circuit both including in part common circuit control elements with means for balancing one circuit during control of the servomotor by the other circuit to permit transition of servomotor control from one control circuit to the other without undesirable operation of the motor.

The above and further objects of the invention will become apparent upon a consideration of the following detailed description taken in conjunction with the annexed drawing disclosing a preferred embodiment by which said objects may be realized.

The sole figure comprising the drawings illustrates an embodiment of the invention applied to an electronic stabilizing apparatus for an aircraft.

Referring to the drawing, the invention is for purpose of illustration applied to the lateral attitude control system of an airplane in which an aileron control surface 10 is reversibly positioned by an operating means 11 extending from a motion transmission device 12. Direct manual operation of the aileron 10 is effected by a manually operable control control lever 14 pivoted on a bearing 15 affixed to the craft. A link 13 extends from the lever 14 to the transmission means 12. The transmission means 12 may consist of a rack and pinion with the rack having opposed ends connected with the link 13 and the operating means 11 and the engaging pinion of the rack driven by an output shaft 16 of a servomotor 18. The shaft 16 is operated from the motor 18 through a magnetic clutch 17. The operating motor 18 may be reversibly controlled an it can be alternatively connected by means of control relays 20, 21 and 22 with a manual boost amplifier 23 or a stabilization and manual boost amplifier 24. By means of the combination of the manual boost amplifier 23 and the servomotor 18 a small manual effort may reversibly control the positioning of the aileron surface 10. On the other hand by means of the combination of the stabilization and boost amplifier 24 and servomotor 18 the aileron surface 10 is positioned in accordance with a slight manual effort and additionally from operations derived from craft attitude change and craft attitude change rate sensing devices 31 and 32.

The manual control lever 14 therefore when actuated operates the aileron 10 to change the attitude of the craft and also operates a control device connected with the surface which device controls the amplifier 23. In order to effect a transition from direct manual operation of aileron 10 from lever 14 to manual boost control thereof without a sudden movement of the control surface, the control network 26 of amplifier 23, which includes the control device positioned with the aileron, is maintained in a balanced condition by synchronizing means 34. Similarly if it be desired to effect a transition from direct manual control of aileron 10 to stabilization and boost operation of the aileron, without a sudden movement of the control surface occurring on such transition the control network 28 of the amplifier 24, which also includes the control device positioned with the aileron and attitude sensing control device, is maintained in a synchronized condition by synchronizing means 35 during manual changes in attitude of the craft. Finally while the craft is on manual boost control from the amplifier 23, the control network of the stabilization and boost amplifier 24 is maintained in a balanced condition to permit a transition from manual boost operation of aileron surface 10 to boost and stabilization operation thereof without any sudden operation of the control surface 10 which would cause a lurch of the craft in flight.

Having considered the general aspects of the apparatus, a detailed description thereof follows. The servomotor 18 is of the reversible, D. C. series type comprising an armature 37, a pulsing clutch-brake winding 38, and field windings 39 and 40. The armature 37 and winding 38 are connected in series with one side of the armature connected to ground. The opposite end of winding 38 is connected in parallel to field windings 39 and 40 which have their opposite ends connectible to an energizing source.

Amplifier selector relay 20 for operating motor 18 from either amplifier is of the four pole double throw type comprising an operating winding 41 and operable arms 42, 43, 44 and 45. The relay arms coact respectively with in contacts 46, 48, 50, 52 and out contacts 47, 49, 51 and 53. Motor selector relay 21 is of the three pole double throw type comprising an operating winding 55 and operable arms 56, 57 and 58. The relay arms coact respectively with in contacts 59, 61 and 63 and out contacts 60, 62 and 64. Motor selector relay 21 directly connects amplifier 23 with a motor 110 or through relay 20 connects the amplifier 23 with motor 18. Relay 22 is of the three pole double throw type comprising an operating winding 66 and operable arms 67, 68 and 69. The relay arms coact respectively with in contacts 70, 72 and 74, and the arms also coact with out contacts 71, 73 and 75. Relay 22 directly connects amplifier 24 with a synchronizing motor 150 or through relay 20 connects amplifier 24 with motor 18.

Manual boost amplifier 23 is of the A. C. discriminator type having a pair of A. C. power input conductors 77, 78 connected to a source of alternating current and A. C. signal input conductors 79, 80 connected to a source of alternating control signals. The amplifier 23 includes a pair of relays (not shown) which are alternatively operated depending upon the phase relationship of the voltage from the supply across conductors 77 and 78 with respect to the alternating signal voltage across input conductors 79, 80. The amplifier 24 is similar to the amplifier 23 which may be similar to the amplifier disclosed in Patent 2,425,734 to Willis H. Gille et al.

Control signals for amplifiers 23 are derived from a balanceable network 26 comprising a network synchronizing voltage signal generator 82, a servomotor follow-up signal voltage generator 92, and a manual control signal voltage generator 100. Signal generator 82 comprises a potentiometer 83 having a slider 84 and resistor 85. The resistor 85 is connected across the ends of a secondary winding 86 of a transformer 87. The transformer includes a primary winding 88 connected to the source of alternating current. Amplifier conductor 79 connects a control electrode of amplifier 23 with a center tap of secondary winding 86. Slider 84 is manually adjustable along resistor 85 by manually operable trim knob 89 affixed thereto. Slider 84 is also positioned along resistor 85 through the synchronizing means 34 comprising synchronizing motor 110 and an operating connection 111 extending therefrom to slider 84. The motor 110 may be of the type having permanent magnet field members 112, 113, an armature 114, and a center tapped resistor 115 connected across the armature. From the center tap of resistor extends a ground conductor 116. The signal generator 92 comprises a follow-up potentiometer 93 having a slider 94 and resistor 95, a voltage dividing potentiometer 97 comprising a slider 98 and resistor 99 and a secondary winding 96 of transformer 87. Resistor 95 is connected across the ends of secondary winding 96. The voltage dividing potentiometer resistor 99 is connected between slider 94 and a center tap of secondary winding 96. The slider 94 is positioned along resistor 95 in either direction from its electrical center by a follow-up drive 200 connecting the output side of clutch 17 with slider 94. The slider 98 may be adjusted along resistor 99 to select any ratio of the voltage developed across resistor 99 by the adjustment of slider 94. A conductor 91 connects slider 98 with slider 84. Signal generator 100 comprises a manual control signal potentiometer 101 having a slider 102 and a resistor 103; a voltage dividing potentiometer 104 having a slider 105 and resistor 106; and a secondary winding 96 of transformer 87. Resistor 103 is connected across the ends of secondary winding 96. Slider 102 is positioned along resistor 103 in either direction from the electrical center thereof by a suitable operating means 107 connecting the manually operable control lever 30 with slider 102. The control lever 30 is journalled in a suitable bearing block 108 affixed to the craft. Slider 105 may be positioned along resistor 106 to select any desired ratio of the voltage developed between slider 102 and the center tap of secondary winding 96 which is applied across resistor 106. A conductor 118 connects slider 105 with an out contact 53 of relay 20, and the amplifier input control circuit is completed through relay pole 45 and its ground conductor 119 to the ground conductor 80 connected to the other control electrode of amplifier 23.

Amplifier 24 is provided with power input conductors 121 and 122, connected to the ship supply of alternating current, and signal input conductors 123, 124. Control signals are applied across conductors 123, 124 from a balanceable circuit having a main network 28 comprising a subnetwork 29 and the network 26 slightly modified. The subnetwork 29 comprises a lateral attitude change rate signal generator 117, a lateral attitude change signal generator 132, and a network synchronizing signal generator 137. The signal generator 117 comprises a potentiometer 125 having a slider 126 and resistor 127, a voltage dividing potentiometer 128 having a slider 129 and a resistor 130 and a secondary winding 136 of transformer 87. Resistor 127 is connected across the ends of secondary winding 136. Resistor 130 is connected between the slider 126 and a center tap of secondary winding 136. Slider 126 is positioned along resistor 127 in either direction from the electrical center thereof by a suitable operating means 131 connecting it with an angular rate responsive gyroscope 32. Slider 129 may be positioned along resistor 130 to select any ratio of the voltage developed between slider 126 and the center tap of secondary winding 136. Conductor 123 comprising one end of the circuit connects one control electrode of amplifier 24 to slider 129. The signal generator 132 comprises a potentiometer 133 having a slider 134 and resistor 135 which is connected across the ends of secondary winding 136 of the transformer 87. Slider 134 is positioned along resistor 135 by a suitable operating means 148 connecting it with a vertical gyroscope in accordance with the lateral attitude of the craft about its longitudinal axis. The rate gyroscope 32 is of the type well known in the art having a rotor with angular freedom about its spin axis and angular freedom about a second axis at right angles to its spin axis the freedom about the second axis being restrained by spring means or other suitable device. The gyroscope is so arranged on the craft that the slider 126 is moved relative to resistor 127 in a direction and an extent depending upon the direction and rate of change of lateral attitude of the craft. The vertical gyroscope 31 is of the conventional three degree of angular freedom type with its spin axis in a vertical position and with the rotor additionally having angular freedom about two respectively horizontal axes. Gyroscope 31 is so arranged on the craft that slider 134 is moved in a direction and an extent relative to the center of resistor 135 proportional to the direction and extent of lateral tilt of the craft.

The synchronizing signal generator 137 comprises a potentiometer 138 having a slider 139 and resistor 140 which is connected across the secondary winding 86 of transformer 87. Slider 139 may be positioned along resistor 140 by a synchronizing means comprising a synchronizing motor 150 and an operating connection 141 connecting the motor with slider 139. The motor 150 is similar to motor 110 and comprises permanent magnet field members 142, 143, armature 144, and a resistor 145 connected across armature 144 and having a grounded center tap conductor 146. A conductor 150 connects slider 139 with slider 134 in signal generator 132. The modification of network 26 in main network 28 over that described is in the manual control signal generator 100 and is obtained by substituting effectively a voltage dividing potentiometer 151 for the voltage dividing potentiometer 104. The potentiometer 151 comprises a slider 152 and resistor 153 which is connected across a center tap of secondary winding 96 of transformer 87 and the manually adjustable slider 102. A conductor 149 connects slider 152 with in contact 52 of relay 20 from whence the input control circuit of amplifier 24 is completed through the operated relay arm 45, ground conductor 119 to the amplifier ground conductor 124 connected to the other amplifier controlled electrode.

The relay 20 has an unoperated or boost plus stabilization position or alternatively an operated or boost position. The winding 41 of relay 20 is energized through a manually operable single pole switch 154 from a battery 155. The relay 21 has an unoperated or servomotor disengage position and alternatively an operated or boost and boost plus stabilization position. The winding 55 of relay 21 is energized from battery 155 through a single pole single throw manually operable switch 156. The relay 22 has an unoperated or servomotor disengage and boost position and alternatively an operated or boost plus stabilization position. The winding 66 of relay 22 is energized from a battery 158 through a manually operable single pole single throw switch 157.

Having described the structure of the apparatus the operation thereof during three different modes of control will be considered. If the aileron control surface 10 is to be directly manually operated from the control lever 14, the manually operable single pole switches 156 and 157 remain in their unoperated position. With the control surface thus manually operated, the operation thereof will through the transmission means 12, mechanical connections 16 and 200 displace slider 94 relative to resistor 95 to unbalance network 26. A signal is thereby developed between the center tap of secondary winding 96 and slider 94 which unbalances the control circuit of amplifier 23 and causes a control signal to be applied across the conductors 79 and 80 of amplifier 23. Depending upon the direction of unbalance of the network 26, one or the other of the relays in amplifier 23 will be operated. Assuming one direction of unbalance, the closing of one relay will complete a circuit from battery 155, conductor 147, the operated relay in the amplifier, conductor 159, unoperated relay arm 56, relay out contact 60, conductor 160, centering motor armature 114, resistor 115 to ground through conductor 116 and return to battery ground conductor 161. The centering motor 110 will operate the slider 84 relative to resistor 85 to set up a signal between slider 84 and the center tap of winding 86 which balances network 26 terminating operation of motor 110.

If the craft has changed attitude due to manual operation of surface 10, the vertical gyroscope 31 will displace slider 134 relative to resistor 135 whereby a control signal is developed in subnetwork 29. This control signal is applied across signal input conductors 123 and 124 and depending upon the phase relationship thereof with respect to the voltage across power conductors 121 and 122 one or the other of the relays in amplifier 24 will be operated. Assuming one amplifier relay to have been operated, a circuit is completed from battery 158, conductor 162, through the operated relay, conductor 163, unoperated relay arm 67, out contact 71, conductor 167, centering motor armature 144, resistor 145, centering motor ground conductor 146, and returned to battery ground conductor 164. The motor 150 as thus energized will displace slider 139 relative to resistor 140 to set up a signal in network 29 equal and opposite to the voltage derived from the displacement of slider 134. Thus both networks 26 and 29 are maintained in a balanced condition during operation of aileron surface 10 to control lateral attitude of the craft.

It is apparent that if the original control signal in network 26 due to operation of slider 94 were of the opposite phase that the other amplifier relay would be operated thereby completing a circuit from battery 155, conductor 147, the operated relay in amplifier 23, conductor 165, unoperated relay arm 58, out contact 64, conductor 166, centering motor armature 114, resistor 115, ground conductor 116, and return to battery ground 161. It is also true that if the lateral attitude of the craft due to movement of the aileron 10 manually was of the opposite direction that the control signal across conductors 123 and 124 of amplifier 24 would be of the opposite phase and would effect operation of the other amplifier relay. A circuit would thereupon be completed from battery 158, conductor 162, the operated amplifier relay, conductor 168, the unoperated relay arm 69, relay out contact 75, conductor 169, armature 144, resistor 145, ground conductor 146, and return to battery ground 164. Thus the synchronizing motors 110 and 150 may be reversely operated to maintain the balance in networks 26 and 29. This operation occurs when the aileron surface 10 is being directly manually operated.

When it is desired to control the aileron 10 from the manual control lever 30 through a power boost configuration or second mode the switch 154 is closed causing the relay 20 to move its relay arms to the operated or boost position. The switch 156 is also operated to energize winding 55 whereby the relay arms of relay 21 are moved to their operated position termed the boost and boost plus stabilization position. With the relays 20 and 21 so operated, the output conductor 159 of boost amplifier 23 is connected through operated relay arm 56, relay in contact 59, conductor 170, relay in contact 50, operated relay arm 44, to winding 40 of servomotor 18; the other amplifier output conductor 165 is connected through operated relay arm 58, in contact 63, conductor 173, in contact 48, operated relay arm 43, to motor field winding 39. Clutch 17 is energized from battery 155, operated relay arm 57, in contact 61, relay in contact 46, operated relay arm 42. If the control lever 30 be moved to adjust slider 102 relative to resistor 103, a voltage is set up in network 26 which is applied across the amplifier input conductors 79 and 80 of boost amplifier 23. The boost amplifier, depending upon the phase relationship of the input signal relative to the voltage from the supply, effects operation of the motor 18 in one or the other direction. The motor 18 positions the aileron surface 10 through the now energized clutch 17 and also through the operating connection 100 displaces the slider 94 relative to resistor 95 to balance the control circuit of amplifier 23.

If the control network 28 of amplifier 24 be unbalanced, the amplifier will close one or the other of its relays whereby the synchronizing motor 150 operates slider 139 to maintain balance in the input circuit of amplifier 24. It is thus apparent that irrespective of the direction in which the boost control lever 30 is operated, that the aileron surface will be operated accordingly and the network 26 connected to amplifier 23 will be maintained in a balanced condition with the aileron 10 being displaced in proportion to the amount of movement of the control lever 30. Also the input circuit of amplifier 24 will be maintained in a balanced condition by operation of the motor 150 as needed.

The operation of the synchronizing motor 150 during boost operation may occur in the following manner. The control lever 30 may be adjusted and the aileron displaced until the craft approaches the desired bank angle when lever 30 is returned to its center position which movement is accompanied by the return of the aileron surface 10 and the servomotor 18 to its normal position. The attitude of the craft at this time causes the vertical gyroscope to operate slider 134 relative to resistor 135 whereby the control circuit of amplifier 24 is unbalanced. The amplifier 24 effects operation of the synchronizing motor 150 so that slider 139 is moved relative to resistor 140 to balance the input circuit.

It will now be apparent that with the input circuit of amplifier 24 in a balanced condition during manual boost operation, a transition or change in configuration to a third mode of operation of the apparatus can be made whereby control may be derived from the vertical gyroscope 31 and rate gyroscope 32 along with the manual control from controller 30 without there being any unbalance in the input circuit of amplifier 24 which might cause a sudden operation of the motor 18, providing no change in attitude has occurred during this transition.

To provide for control from the vertical gyroscope 31 and the rate gyroscope 32 along with the control lever 30, the single pole switch 157 is moved to operated position and the switch 154 is moved to unoperated position. With the relay 22 operated and the relay 20 unoperated, the output conductor 163 of amplifier 24 is connected through operated relay arm 67, in contact 70, conductor 174, relay out contact 49, unoperated relay arm 43, to motor field winding 39; the other amplifier output conductor 168 is connected through operated relay arm 69, in contact 74, conductor 175, out contact 51, unoperated relay arm 44, to motor field winding 40. Should the craft change attitude due to an external disturbance, this change in lateral attitude is sensed by the vertical gyroscope 31 which displaces slider 134 to unbalance the input circuit of amplifier 24. The amplifier 24 operates and effects energization of the servomotor 18 to displace the aileron surface 10 whereby the change in attitude is corrected. The servomotor 18 operates the follow-up slider 94 to maintain the control circuit of amplifier 24 in balanced condition.

If desired, the lateral attitude of the craft may be manually changed by moving control lever 30 to unbalance the input circuit of amplifier 24. In response to this unbalance, the amplifier 24 effects operation of the servomotor 18 which positions the slider of the follow-up potentiometer 94 to balance the circuit and also adjust the aileron surface 10. As the craft changes attitude due to the displaced aileron, the vertical gyroscope operates slider 134 to give a reverse unbalance of the control circuit of amplifier 24 whereby the servomotor 18 operates in a reverse direction until the aileron is restored to its normal position. At this time, the control signal from the adjustment of lever 30 balances the signal derived from the operation of slider 134 from vertical gyroscope 31 due to the change in attitude.

If it be desired to return to manual boost control with the craft attitude about its longitudinal axis other than horizontal, and the apparatus is assumed in a stabilization plus boost configuration, the single pole switch 157 may be moved to open position and the switch 156 is moved momentarily to open position thereby permitting any unbalance of control circuit 26 applied to amplifier 23 due to displacement of the control lever 30 to be balanced by the operation of the synchronizing motor 110. At this time the control lever 14 may assume momentary control of the aileron surface 10 for a short period. Thereafter the switch 156 may be moved to closed position and the switch 154 is moved to closed position thereby permitting the servomotor 18 to be controlled from the boost amplifier 23.

The two voltage dividers 104 and 151 are provided across the manual control potentiometer 101 so that separate proportions of the voltage derived from the operation of the controller are available. Their adjustable taps 105 and 152 are normally placed in an adjusted position and retained there. During operation of the control lever 30 when manual control only of the servomotor 18 is provided, the voltage dividing potentiometer 151 selects a lower ratio of the voltage between slider 102 and the center tap of secondary winding 96 than would be selected by the potentiometer 104. This permits the pilot to move the control lever 30 in a manner similar to that which it would be moved during boost plus stabilization without setting up in the control circuit of amplifier 23 a signal of such magnitude that it would cause a sudden lurch and movement of the craft.

During stabilization plus boost configuration, since the vertical gyro signal and rate gyro signal oppose the signal from the control lever 30 on banking of the craft a larger portion of the signal from the manual control potentiometer 101 may be utilized without causing a lurch in craft movement. In this configuration the voltage dividing potentiometer 104 is effective but potentiometer 151 ineffective. A resistor 109 extends from slider 102 to ground to assure a continuity of the control circuit should there be any interruption in the amplifier input circuit by failure of relay arm 45 to properly engage a relay contact.

It will now be evident that I have provided a control apparatus which may assume three configurations for positioning a control surface wherein two of the configurations control a servomotor that positions a control surface of an aircraft may be alternatively controlled from two amplifiers each having an input control circuit including dissimilar control elements but having common control elements in part and wherein no sudden operation of the servomotor occurs during transfer of operation thereof from one amplifier to the other. It will also be evident that the invention may assume widely different forms and that the invention may have widely different applications and embodiments, it is therefore desired that the above disclosure may be considered as illustrative only and not in a limiting sense.

I claim as my invention:

1. An apparatus for controlling the attitude of a dirigible craft about one of its axes by positioning a control surface thereof, a servomotor adapted to position said control surface; a first balanceable means comprising means for producing a voltage varying in response to variation of attitude of said craft about said one axis and means operated from a normal posiiton for producing an attitude control voltage, a first servo means connectable to said balanceable means for operation therefrom for producing in said balanceable means a voltage in accordance with the relative values of the attitude voltage and the attitude control voltage, a second balanceable means including said means for producing an attitude control voltage, a second servo means connectable with said second balanceable means for operation therefrom and supplying to the second balanceable means a voltage varying with said attitude control voltage; means for alternatively solely controlling said servomotor that positions said surface from said first balanceable means while the first servo means is disconnected and controlling said second servo means from said second balanceable means or solely controlling said servomotor from said second balanceable means while said second servo means is disconnected and controlling said first servo means from said first balanceable means whereby control of said servo motor, without reaction on said craft, may be transferred from one balanceable means to the other while the operated position of the attitude control voltage producing means is unchanged.

2. An apparatus for controlling the attitude of a dirigible craft including a control surface for varying said attitude, a first balanceable servo mechanism including a signal responsive device controlled by three signals, position maintaining means providing a first of said signals varying in response to variation of attitude of the craft, manual means providing an attitude control or second signal, and further means operated by the signal responsive means for providing a synchronizing signal or third of said signals, said third signal varying in accordance with the algebraic sum of the first two signals, a second servo mechanism including a second signal responsive device controlled by two signals namely the attitude control signal and a second signal provided by a second synchronizing signal providing means operated by the second signal responsive device proportional to said attitude control signal, a servomotor adapted to position said surface, and means for controlling said servomotor alternatively from said first signal responsive means while the further means is unoperated by the signal responsive means and while effecting positioning of said second synchronizing signal providing means from the second signal responsive device or controlling said servomotor from said second signal responsive means while the second synchronizing signal providing means is unoperated and positioning said first synchronizing signal from said first signal responsive means.

3. Apparatus for selectively controlling the attitude of a craft in accordance with a signal or permitting direct manual control of the craft's attitude, comprising: a servomotor adapted to position a control surface to change craft attitude; a first servo means including a first signal responsive device; an attitude responsive device for supplying a signal varying with craft attitude, manually operable attitude selector means for producing a variable signal component; a first synchronizing means controlled by said signal responsive device and developing a control signal in accordance with the algebraic sum of the attitude responsive signal and the manually controlled signal; means for supplying a resultant of the three signals to the said first signal responsive device; a second servo means including a second signal responsive device; means for controlling said second signal responsive device from said manually produced signal; a second synchronizing device controlled from said second signal responsive device and producing a control signal in accordance with the magnitude of said manually produced signal and also controlling said second signal responsive device in accordance with the resultant of the manually produced signal and the second synchronizing signal, whereby the first and second signal responsive devices are maintained in a balanced condition during direct manual operation of said surface, and means for alternatively controlling said servomotor from said first or second signal responsive device.

4. In an automatic pilot for an aircraft having a servomotor for positioning a control surface to change attitude, a first signal voltage responsive device, a second signal voltage responsive device, a first balanceable voltage network for said first signal responsive device including means for producing a voltage in response to variation of attitude of said craft and means for producing an attitude control voltage, a second balanceable network for said second signal voltage responsive device, means for producing in said second network an attitude control voltage, means for selectively controlling said servomotor from either signal responsive device, and means operated by the nonselected signal responsive device for balancing the network of the non-selected signal responsive device during such selected control of said servomotor.

5. Apparatus for stabilizing the attitude of a craft and selectively permitting manual changes in craft attitude, said apparatus comprising an attitude reference means responsive to change in attitude, a first signal responsive means controlled by said attitude reference means, a servomotor for positioning a control surface to change attitude and connectable to said first signal responsive device, manually operable means for changing craft attitude, a second signal responsive device connected to said manually operable means and alternatively connectable with said servomotor, a servomotor operated follow up means controlling both signal responsive means, and synchronizing means connected to the first signal responsive device and operated thereby for varying the attitude maintaining characteristics of said first signal responsive device during connection of said second signal responsive device to said servomotor.

6. In flight control apparatus for an aircraft having a control surface for changing craft attitude, a servomotor adapted to position said surface, a position responsive means for detecting changes in attitude, a first balanceable means controlled by said position responsive means and including an amplifier selectively connectable to said servomotor, a manually operable means for changing craft attitude, a second balanceable means controlled by said manually operable means and including an amplifier alternatively selectively connectable to said servomotor, and synchronizing means in said first balanceable means and controlled by the amplifier thereof for varying the attitude maintaining characteristics of said first balanceable means during control of said servomotor by said second balanceable means.

7. In control apparatus for an aircraft having a control surface for changing craft attitude, a servomotor adapted to position said surface, position maintaining means for detecting changes in attitude, signal responsive balanceable means having an input end controlled by said position and maintaining means and having an output end for controlling said servomotor to maintain a selected attitude, means for rendering the output end of said balanceable means ineffective to control said servomotor, a manually operable attitude change device, a servomotor driven follow-up device, means for controlling said servomotor from said manually operable device and said servo follow-up device when the output end of said first balanceable means is rendered ineffective, and synchronizing means in said input end of the balanceable means and controlled by the output end of the balanceable means for varying the attitude maintaining characteristics of said first balanceable means during manually controlled changes in attitude.

8. Control apparatus for an aircraft having a control surface for varying craft attitude, a servomotor adapted to position said surface, a position maintaining device operating a signal generator for producing a control signal in accordance with changes in attitude, a manually operable attitude change signal generator, a servomotor operated follow up signal generator, a first balanceable means connectable with said servomotor, a second balanceable means alternatively connectable with said servomotor, means for controlling said first balanceable means from said three signal generators, means for controlling said second balanceable means from said manually controlled signal generator and follow up generator, and means controlled by the second balanceable means for maintaining the balance of said second balanceable means during operation of said servomotor from said first balanceable means.

9. Control apparatus for an aircraft having a control surface for changing craft attitude about an axis comprising: a servomotor operably connected with said surface; two amplifiers for alternatively controlling said servomotor; a control circuit for one amplifier comprising a pair of adjustable members; means for adjusting one member to initiate operation of said amplifier and therefore change in craft attitude; follow-up means driven by said servomotor and connected to another member to rebalance said amplifier circuit; a second control circuit for said other amplifier having adjustable members, means responsive to change in craft attitude due to operation of said surface for adjusting one member in said second control circuit; synchronizing means controlled from said other amplifier during control of the servomotor by the one amplifier for adjusting another member in said second control circuit to maintain said second circuit in balanced condition whereby no sudden operation of said motor occurs upon transferring control of said servomotor from said one amplifier to the other amplifier.

10. Control apparatus for an aircraft having a control surface for controlling craft attitude about an axis, in combination: a servomotor for positioning said surface; control means for actuating said servomotor; operating means for said control means comprising means for producing a control voltage varying in accordance with a desired operation of said surface, means for producing another control voltage varying with the operation of the servomotor; an alternative control means for said servomotor; a synchronizing motor operated from said alternative control means during actuation of said servomotor from the first control means, balanceable means for operating said alternative control means including means responsive to the first and second voltages and additionally responsive to the change in craft attitude and to the synchronizing motor to provide smooth transition of servomotor control from the first control means to the alternative control means and means to prevent operation of the synchronizing motor during control of the servomotor by the alternative control means.

11. Control apparatus for an aircraft having a servomotor to position a control surface for controlling craft attitude, said apparatus comprising: a pair of alternatively selective control means for operating said control surface servomotor, a balanceable circuit means for one control means and a second balanceable circuit means for the other control means, means for unbalancing said first circuit means to effect operation of said first control means and said surface servomotor, follow-up means positioned with said surface for rebalancing said circuit means, means responsive to change in craft attitude due to operation of said surface for unbalancing the circuit means of said second control means, synchronizing means operated by said second control means for rebalancing said second circuit means, and means for shifting operation of the synchronizing means to operation of the servomotor from the other control means and severing the servomotor from the one control means whereby smooth transition from the first control means to the second control means may be effected without sudden operation of the control surface with the craft in the changed attitude.

12. Control apparatus for an aircraft having a servomotor to position a control surface for controlling craft attitude, said apparatus comprising: two alternatively selectable control means for controlling said control surface servomotor each control means having a balanceable circuit means individual thereto with the two balanceable circuit means having a portion thereof common with the other and a portion not common with the other; means for unbalancing the first balanceable circuit means to effect control by said first control means of said surface servomotor; follow-up means positioned with said surface for rebalancing said first balanceable circuit means; means responsive to change in craft attitude due to operation of said surface for unbalancing the balanceable circuit means of said second control means; synchronizing means controlled by said second control means for rebalancing said second balanceable circuit means; and means for shifting control by the second control means of the synchronizing means to control by the second control means of the servomotor and severing control of the servomotor from the first control means, whereby smooth transition from the first control means to the second control means may be effected without sudden operation of the control surface with the craft in the changed attitude.

References Cited in the file of this patent

UNITED STATES PATENTS

| | | |
|---|---|---|
| 2,415,429 | Kellogg | Feb. 11, 1947 |
| 2,419,970 | Roe et al. | May 6, 1947 |
| 2,429,642 | Newton | Oct. 28, 1947 |
| 2,471,637 | MacCallum | May 31, 1949 |
| 2,570,905 | Young et al. | Oct. 9, 1951 |
| 2,589,834 | MacCallum | Mar. 18, 1952 |
| 2,618,771 | Stanley et al. | Nov. 18, 1952 |
| 2,626,114 | Alderson | Jan. 20, 1953 |
| 2,627,384 | Esval | Feb. 3, 1953 |